Figure 1:
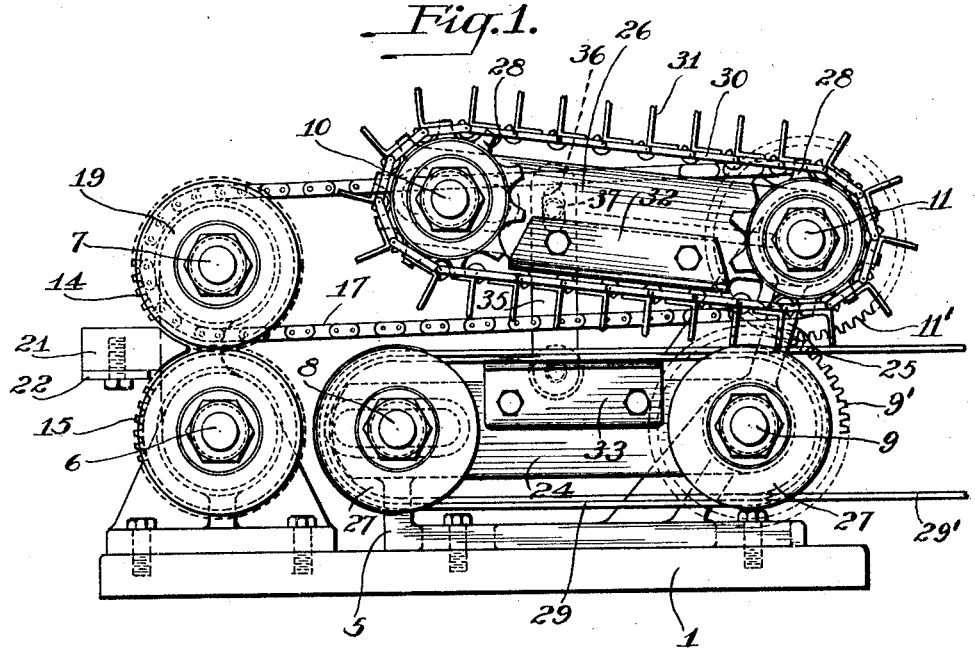

Mar. 5, 1929.　　　　M. T. SCHOLL　　　　1,703,962
CANDY FORMING AND CUTTING MACHINE

Filed April 3, 1926　　2 Sheets-Sheet 1

WITNESSES　　　　　　　　　　　　　　INVENTOR
A. B. Wallod.　　　　　　　　　　　　　Milo T. Scholl
William B. Jaspert.　　　　　　　　　by Winter Brown & Critchlow
　　　　　　　　　　　　　　　　　　　his attorneys.

Mar. 5, 1929.  M. T. SCHOLL  1,703,962
CANDY FORMING AND CUTTING MACHINE
Filed April 3, 1926  2 Sheets-Sheet 2

*Fig. 3.*

WITNESSES

INVENTOR
Milo T. Scholl
by
Winter Brown & Critchlow
his attorneys.

Patented Mar. 5, 1929.

1,703,962

UNITED STATES PATENT OFFICE.

MILO T. SCHOLL, OF BALDWIN TOWNSHIP, ALLEGHENY COUNTY, PENNSYLVANIA.

CANDY FORMING AND CUTTING MACHINE.

Application filed April 3, 1926. Serial No. 99,529.

This invention relates to candy machines, and more particularly to improvements in candy machines adapted for coordinating the functions of forming and cutting strips of candy.

It is among the objects of this invention to provide a candy machine which shall embody means for initially forming strips of candy of any desired cross-sectional shape having solid or filled sections, and subsequently passing the strips so formed by means of a conveyor belt underneath a series of cutting knives which are arranged to simultaneously cut off and seal the strip of candy into pieces of any desired lengths, the strips being directly supported by the belt while being cut.

Another object of this invention is to provide a candy machine of the above designated character which shall be of simple, compact, and durable mechanical construction and in which the forming rolls and cutting knives are replaceable and renewable in accordance with the shapes and lengths of the product it is desired to obtain.

Another object of this invention is to provide a candy machine having a cutting element comprising an endless chain provided with knives in spaced relation which chain and knives are mounted at a slight inclination relative to the plane of the candy conveyor member for the purpose of gradually cutting through a strip of candy at a plurality of points as it passes along the conveyor belt so that both ends of the pieces are simultaneously sealed to prevent extrusion of their soft centers.

Various forms of candy making machines have been heretofore proposed which embody a cutting element for severing the pieces of candy consisting of a pair of endless cutter chains in cooperative relation having knives or cutters adapted to cooperate to sever the candy bar or strip passing therebetween, or to produce indentations in such bar so that the same may be broken in pieces after passing through the chain members.

In accordance with the present invention but a single cutter chain is employed in cooperative relation with a conveyor belt for the purpose of cutting off a strip or bar of candy in relatively short lengths in such a manner that the ends are cut simultaneously and sealed off to protect the interior filler and to provide a piece of candy having a relatively flat bottom which facilitates the packing of the same in suitable containers. In addition, the invention contemplates the utilization of a pair of forming rolls and guide blocks cooperating with the conveyor belt and cutter chain and connected generally to constitute the several cooperating elements of a unit machine adapted to be actuated from a common prime mover for the purpose of coordinating the speed of feeding the candy through the rolls and the operating speed of the cutter members.

Figure 2:
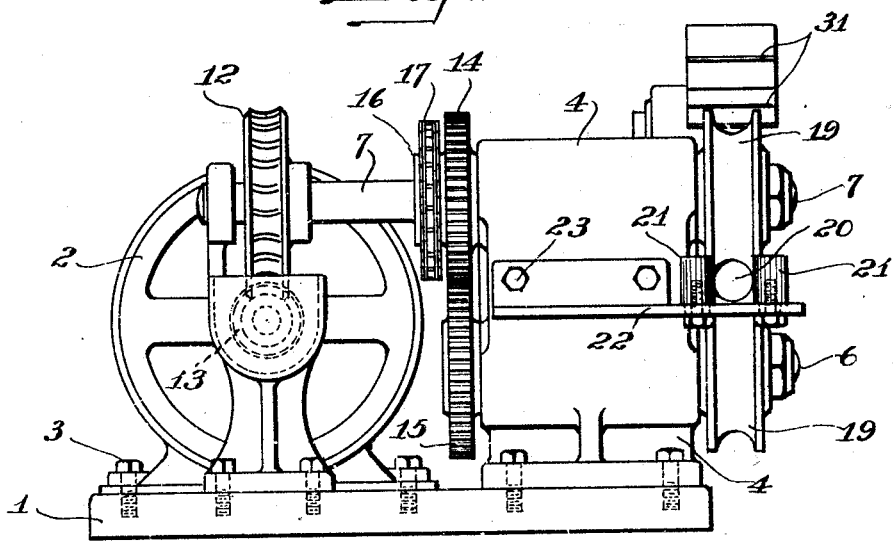

In the accompanying drawings constituting a part hereof, and in which like reference characters designate like parts, Fig. 1 is a side elevational view of a candy making machine embodying the principles of this invention, Fig. 2 is a front elevational view thereof, and Fig 3 is a top plan view illustrating the drive connections of the several cooperating members.

Referring to Figs. 1 and 2 of the drawings, the structure therein illustrated comprises a base plate 1 having a motor 2 secured thereto as by bolts 3 and having a pedestal bearing 4 and bearing frames 5 secured thereto to respectively journal a plurality of roller shafts 6 and 7, pulley shafts 8 and 9, and sprocket gear shafts 10 and 11.

The shaft 7 extends beyond the motor shaft and is provided with a worm gear 12 that meshes with a worm 13 mounted on the motor shaft. The shaft 7 is further provided with gear wheels 14 and 15 constituting a positive connection for the shafts 6 and 7, and the shaft 7 is provided with a sprocket wheel 16 connected by a sprocket chain 17 to a sprocket wheel 18 carried by the shaft 11 and the latter is connected by gear wheels 11' and 9' to the shaft 9. The ends of the shafts 6 and 7 extending beyond the bearing bracket 4 are provided with detachable forming rolls 19, cooperating to produce a cylindrical form 20 therebetween, and a pair of stationary guide blocks 21 are secured to bracket 22 fastened by bolts 23 to the side of the pedestal bracket 4. By detachably mounting the forming rolls on shafts 6 and 7 as just explained, other rolls adapted to mold or form strips into shapes having different cross sections may be substituted. The bearing frame 5 comprises a base by which it is secured to the bed plate 1, a cross piece or frame portion 24 extending across the journals of the shafts 8 and 9, a vertically extending arm 25 and a frame portion 26 connecting the bearing portions of the shafts 9 and 11, and 10 and 11 respectively, frame portion 26 being pivotally mounted on shaft 11 Pulleys 27 are secured to rotate with the shafts 8 and 9 and sprocket gears 28 are mounted for rotation with the shafts 10 and 11. An endless conveyor belt 29 is disposed around the pulleys 27, and an endless cutter chain 30 is disposed around the sprocket wheel 28. An additional conveyor belt 29' may be superposed upon the belt 29 to convey the candy away from the machine as shown.

A plurality of cutting knives 31 are removably secured to the cutter chain 30 in the manner shown so that their relative spacing may be varied. A pair of angle bars 32 and 33 are secured to the cross frame portions 26 and 24 to provide supports for the conveyor belt 29 and the cutter chain 30 in the region of their cooperative engagement with a strip of candy which is passed through the guide blocks 21, the forming rolls 19 and carried by the belt 29 underneath the knives 31.

The outer end of frame portion 26 carrying the cutter chain is adjustable relative to the frame portion 24 by means of a link 35 having a slotted opening 36 adapted to receive a clamping bolt 37 by means of which the frame 26 may be adjustably secured to the link 35 to alter the degree of inclination of the frame 26 with respect to the upper plane of the conveyor belt 29, the purpose of this adjustment being to alter the effective cutting positions of the knives 31 as they pass in proximity with the conveyor belt 29, and to render the machine capable of properly cutting strips of different sizes.

The operation of this device is briefly as follows: The candy consisting of a preformed strip or casing having soft fillers such as peanut butter, caramel, or the like, is passed between the guide blocks 21 through the forming rolls 19 to conform it to a shape corresponding to the opening 20 therebetween, and as it passes out of the rolls 19 it is supported on the endless conveyor belt 29 by means of which it is conducted in the direction of the travel of the cutter chain 30 on which the cutters 31 move at the same rate of speed as the candy passing over the conveyor. As the strip moves in the direction away from the forming rolls 19 the knives 31 gradually contact with the strip, which is firmly supported by the belt 29 and its support 33 intermediate the pulleys 27, to produce uniformly spaced indentations which are formed deeper as the strip passes to the end of the conveyor belt and are finally severed as they reach the end to cause them to fall off into a suitable receptacle or container. From the disposition of the cutter chain relative to the surface of the conveyor belt the pieces of candy cut off are sealed at both ends to protect the relatively soft interior fillers and are further formed with a flat bottom which is advantageous in the subsequent packing of the pieces in suitable containers.

It is evident from the foregoing description of this invention that candy forming and cutting machines made in accordance therewith provide simple, efficient and economical means for manufacturing candy of uniform shape and lengths, and that the construction of the machine is such as to make the several operating mechanisms available for inspection and renewal.

Although a specific embodiment of the invention has been herein described, it will be obvious to those skilled in the art that various modifications may be made in the details of construction and in the arrangement of the several cooperating parts without departing from the principles herein set forth.

I claim:

A candy machine comprising in combination a pair of forming rolls, conveyor mechanism disposed beyond said rolls and in alignment therewith comprising spaced pulleys, a belt traveling thereon, a second conveyor belt superposed on said first-named belt, means for varying the distance between said pulleys to regulate the tension of said belts, a support between said pulleys for the conveyor side of said belts, a link cutter belt supported over said conveyor, a plurality of cutting knives removably secured to said cutter belt, said cutter belt being angularly disposed with relation to said conveyor so that successive knives gradually approach the formed candy carried on said conveyor whereby the candy is continuously severed into definite lengths, means for adjusting said cutter belt to vary said angular relation, a motor, and driving connections between said motor and said forming rolls, conveyor belts and link cutter belt for simultaneously driving them for coordinated action.

In testimony whereof, I sign my name.

MILO T. SCHOLL.